Patented Feb. 15, 1949

2,462,030

UNITED STATES PATENT OFFICE 2,462,030

OXYCHLORIDE CEMENTATORY MATERIAL

Edward D. F. Whitehead, Chevy Chase, Md., assignor to Whitehead-Craft Corporation, Washington, D. C., a corporation of Delaware No Drawing. Application October 20, 1947, Serial No. 781,019

12 Claims. (Cl. 106—106)

This invention relates to so-called Sorel type cement which is composed essentially of an aggregate combined with a magnesium oxy-chloride cementitious binder.

The use of Sorel type cement has heretofore been limited to applications where it is not exposed to moisture or water because such exposure, over a prolonged period, results in a deterioration of the cement. Inasmuch as magnesium oxychloride cement contains soluble ingredients, once water is absorbed into the pores of the hardened cement, the soluble ingredients are dissolved and the cemented material rapidly deteriorates.

It is the major object of this invention to provide a magnesium oxy-chloride cement which is substantially impervious and water insoluble.

Particularly, an object of the invention is to produce a hard mass of mineral aggregate material surrounding, coating and adhering to the particles of the aggregate and filling the interstices between such particles thereby forming a hardened cement which has a substantially impervious surface and is insoluble in water.

More specifically, an object of the present invention is to add chemical reagents to magnesium oxy-chloride cement which will result in a chemical reaction producing exothermic heat to drive off gases from the plastic mass, the reaction products hardening to form a mineral aggregate insoluble in and practically impervious to water, the reaction products drying into a hardened substantially impervious and water insoluble mineral aggregate.

Fundamentally, this invention is based upon the discovery that the addition of alumina and copper sulphate, copper carbonate, or a mixture of copper sulphate and copper carbonate to a cementitious mixture of silica and magnesium oxychloride causes a chemical reaction resulting in a molecular interchange between the reactive chemicals. This results in the creation of a hard substantially impervious and insoluble material with the interstices of the mass filled by the combined magnesium, aluminum and copper compounds.

To produce this result a dry mixture is first prepared by thoroughly mixing dry finely divided silica (sand), magnesium oxide, alumina, and copper sulphate or copper carbonate.

To the dry mixture is added a gauging solution of magnesium chloride. This gauging solution may be prepared in many different ways but it has been found particularly advantageous to first add sufficient magnesium sulphate to a quantity of water to neutralize the calcium content of the water. After the magnesium sulphate is dissolved, sufficient magnesium chloride is dissolved in the magnesium sulphate solution to produce a specific gravity of 1.21 to 1.24. For water obtained from the city supply, one liter requires approximately 13.5 grams of magnesium sulphate. To this one liter of magnesium sulphate solution is added approximately 925 grams of magnesium chloride to produce a solution having a specific gravity of 1.21 to 1.24. The magnesium chloride solution is then allowed to stand for a period of not less than 24 hours. During this time impurities precipitated in the solution sink to the bottom so the pure solution may be drained off. The pure solution can be kept indefinitely without deterioration if sealed from exposure to the air.

This gauging solution is then added to the dry mixture and the mass is thoroughly mixed to form a cementatory material. The plastic mass may be cast, poured, molded, troweled, extruded, or pressed into a wide variety of products.

When exposed to air the shaped plastic mass dries into a hard stone-like mineral aggregate, having a substantially impervious surface. The material is not only water repellent but is practically insoluble in water and resists the action of many active chemicals.

The water repellent characteristics resulting from this invention are so improved that the hardened mineral aggregate may be used in applications where previous cements of the Sorel type would not be satisfactory. For example, cementatory material embodying the present invention may be used to pour monolithic houses or to be coated on the interior surfaces of water mains to form a long lasting lining. Previously known oxy-chloride cements would break down under similar exposure to moisture and water.

Depending upon the desired end use of the cementatory material, any quantity of an inert aggregate may be added to the dry mixture. For example, the cementatory binder with the addition of different quantities of inert aggregate may be used to manufacture wallboard, sound proofing material, and heat insulation. It may also be used as a soil stabilizer.

If desired any quantity of inert coloring material such as iron oxide may be included in the dry ingredients. After the gauging solution is added to the dry mixture, mixing is continued until the proper consistency is attained, dependent upon the type of product and manner of application of the cement.

While the proportions of the ingredients may be varied within certain limits, one example of a mixture which dries without undue delay into a particularly desirable hardened mineral aggregate is as follows:

Ingredients: Mole per cent
- Silica $SiO_2$ ---------------- 35.1
- Magnesium oxide MgO ---------- 20.4
- Alumina $Al_2O_3$ ------------- 2.7
- Copper sulphate $CuSO_4.5H_2O$ -- 1.0
- Magnesium chloride $MgCl_2.6H_2O$ -- 3.1
- Water $H_2O$ ------------------ 37.7

For different purposes, the quantity of silica (sand) may be increased or decreased without affecting the water repellent characteristics of the hardened aggregate. Depending upon the quantity of silica used, the proportions of the various ingredients may be varied within the following range.

Ingredients: Mole per cent
- $SiO_2$ ----------------------- 26.0–58.2
- MgO -------------------------- 23.3–13.0
- $Al_2O_3$ --------------------- 3.0– 1.7
- $CuSO_4.5H_2O$ ---------------- 1.2– 0.7
- $MgCl_2.6H_2O$ ---------------- 3.6– 2.0
- $H_2O$ ------------------------ 43.5–24.4

Preferably, dehydrated alumina is used, such as that identified by the Aluminum Corporation of America as alumina Al.

In each of the above examples, copper carbonate ($CuCO_3$) may be substituted for all or any part of the copper sulphate. Copper sulphate, copper carbonate, or a mixture of copper sulphate and copper carbonate may be used. Each of the following types of copper sulphate has proven satisfactory:

Basic copper sulphate, $CuSO_4.3Cu(OH)_2 2H_2O$
Monhydrate copper sulphate, $CuSO_4.H_2O$
Coarse copper sulphate, $CuSO_4.5H_2O$ The following copper carbonates may be substituted for the copper sulphate or any proportions thereof:

Copper carbonate, $CuCO_3.Cu(OH)_2$
Copper carbonate, $2CuCO_3.Cu(OH)_2$

As previously explained, depending upon the particular application of the cementatory material, the mass of the material may be increased by adding to the dry mixture a quantity of an inert aggregate. The aggregate may be either organic such as sawdust, cork or Irish peat moss, or inorganic such as sand, sand-gravel, granite chips, "Perlite" or "Fine cones," lava rock pulverized, glass slag, foundry sand, crushed rock, crushed trap rock, diatomaceous earths, kaolin, or talc.

The quantity of aggregate added to the material must, of course, be determined by the particular application. For a water main lining, the cementatory material may be used with a minimum aggregate. For insulation purposes, a quantity of cork equivalent to eighty times the combined quantities of the remaining ingredients may be used.

The addition of minor proportions of alumina and copper sulphate or copper carbonate to the dry mixture of magnesium oxide and silica has resulted in improved water repellent characteristics as compared to the characteristics of Sorel type cements heretofore known or used. While the exact chemical processes may not be definitely ascertained, one theory of the reason for this phenomenon is that, upon the addition of the gauging solution to the mass, the ingredients are chemically changed, probably to magnesium silicates, magnesium aluminates, magnesium aluminum silicate and copper aluminate, the latter which may contain magnesium, to form particles of combined magnesium and aluminum and copper which fill the interstices of the mass creating an impervious hard mineral aggregate material which is practically insoluble in water.

The impervious and insoluble characteristics have been achieved in a cement which also has high tensile strength, compression and impact characteristics. In addition to the new applications available to this improved cement, it may also be used particularly advantageously in building bricks, ship decks, fireplaces, and interior trim.

What is claimed is:

1. A cementatory material having the following percentage composition

| | Mole per cent |
|---|---|
| $SiO_2$ | 26–58.2 |
| MgO | 23.3–13.0 |
| $Al_2O_3$ | 3.0–1.7 |
| $CuSO_4.5H_2O$ | 1.2–0.7 |
| $MgCl_2.6H_2O$ | 3.6–2.0 |
| $H_2O$ | 43.5–24.4 |

2. A cementatory material having the following percentage composition

| | Mole per cent |
|---|---|
| $SiO_2$ | 26–58.2 |
| MgO | 23.3–13.0 |
| $Al_2O_3$ | 3.0–1.7 |
| $CuCO_3.Cu(OH)_2$ | 1.2–0.7 |
| $MgCl_2.6H_2O$ | 3.6–2.0 |
| $H_2O$ | 43.5–24.4 |

3. A cementatory material comprising an inert aggregate and a binder having the following percentage composition

| | Mole per cent |
|---|---|
| $SiO_2$ | 26–58.2 |
| MgO | 23.3–13.0 |
| $Al_2O_3$ | 3.0–1.7 |
| $CuSO_4.5H_2O$ | 1.2–0.7 |
| $MgCl_2.6H_2O$ | 3.6–2.0 |
| $H_2O$ | 43.5–24.4 |

4. A cementatory material comprising an inert aggregate and a binder having the following percentage composition

| | Mole per cent |
|---|---|
| $SiO_2$ | 26–58.2 |
| MgO | 23.3–13.0 |
| $Al_2O_3$ | 3.0–1.7 |
| $CuCO_3.Cu(OH)_2$ | 1.2–0.7 |
| $MgCl_2.6H_2O$ | 3.6–2.0 |
| $H_2O$ | 43.5–24.4 |

5. A cementatory material comprising a magnesium oxy-chloride cement, silica, alumina, and a copper reagent selected from the group consisting of copper sulphate, copper carbonate, and mixtures thereof, the mole percentages of the magnesium oxide of said cement, the alumina, and the copper reagent being, respectively, 23.3 to 13.0, 1.7 to 3.0, and 0.7 to 1.2.

6. A cementatory material according to claim 5 wherein the copper reagent is copper sulphate.

7. A cementatory material according to claim 5 wherein the copper reagent is copper carbonate.

8. A cementatory material including an inert aggregate, in combination with a binder comprising a magnesium oxy-chloride cement, silica, alumina, and a copper reagent selected from the group consisting of copper sulphate, copper carbonate, and mixtures thereof, the mole percentages of the magnesium oxide of said cement, the alumina, and the copper reagent being, respectively, 23.3 to 13.0, 1.7 to 3.0, and 0.7 to 1.2.

9. A cementatory material in accordance with claim 8 wherein the copper reagent is copper sulphate.

10. A cementatory material in accordance with claim 8 wherein the copper reagent is copper carbonate.

11. A cementatory material having the following percentage composition

| | Mole per cent |
|---|---|
| $SiO_2$ | 26–58.2 |
| MgO | 23.3–13.0 |
| $Al_2O_3$ | 3.0–1.7 |
| A copper reagent selected from the group consisting of $CuSO_4.5H_2O$, $CuCO_3.Cu(OH)_2$, and mixtures thereof | 1.2–0.7 |
| $MgCl_2.6H_2O$ | 3.6–2.0 |
| $H_2O$ | 43.5–24.4 |

12. A cementatory material including an inert aggregate, in combination with a binder, having the following percentage composition

| | Mole per cent |
|---|---|
| $SiO_2$ | 26–58.2 |
| MgO | 23.3–13.0 |
| $Al_2O_3$ | 3.0–1.7 |
| A copper reagent selected from the group consisting of $CuSO_4.5H_2O$, $CuCO_3.Cu(OH)_2$, and mixtures thereof | 1.2–0.7 |
| $MgCl_2.6H_2O$ | 3.6–2.0 |
| $H_2O$ | 43.5–24.4 |

EDWARD D. F. WHITEHEAD.

REFERENCES CITED

The following references are of record in the file of this patent:

UNITED STATES PATENTS

| Number | Name | Date |
|---|---|---|
| 2,182,291 | Fleuret | Dec. 5, 1939 |
| 2,351,641 | Sohl | June 20, 1944 |

FOREIGN PATENTS

| Number | Country | Date |
|---|---|---|
| 151,589 | Germany | 1904 |